(12) United States Patent
Tsuboi et al.

(10) Patent No.: US 9,444,310 B2
(45) Date of Patent: Sep. 13, 2016

(54) MOTOR DRIVE APPARATUS HAVING A MOTOR, ROTOR, STATOR AND HEAT SINK

(71) Applicants: DENSO CORPORATION, Kariya, Aichi-pref. (JP); ASMO CO., LTD., Kosai, Shizuoka-pref. (JP)

(72) Inventors: Takashi Tsuboi, Okazaki (JP); Takeshi Wakana, Kosai (JP)

(73) Assignees: DENSO CORPORATION, Kariya (JP); ASMO CO., LTD., Kosai (JP)

( * ) Notice: Subject to any disclaimer, the term of this patent is extended or adjusted under 35 U.S.C. 154(b) by 63 days.

(21) Appl. No.: 13/853,446

(22) Filed: Mar. 29, 2013

(65) Prior Publication Data

US 2013/0257192 A1    Oct. 3, 2013

(30) Foreign Application Priority Data

Mar. 29, 2012  (JP) .................................. 2012-76248

(51) Int. Cl.
*H02K 9/00* (2006.01)
*H02K 7/10* (2006.01)
*H02K 9/22* (2006.01)

(52) U.S. Cl.
CPC .................. *H02K 9/22* (2013.01); *H02K 11/33* (2016.01)

(58) Field of Classification Search
CPC ............................... H02K 5/22; H02K 11/00
USPC ............ 310/52, 53, 64, 75 R, 400, 410, 418
See application file for complete search history.

(56) References Cited

U.S. PATENT DOCUMENTS

| 5,377,791 | A  | * | 1/1995 | Kawashima et al. | ......... | 188/159 |
| 2001/0015583 | A1 | * | 8/2001 | Petit et al. | ...................... | 310/72 |
| 2002/0043885 | A1 |   | 4/2002 | Asao et al. | | |
| 2003/0047304 | A1 |   | 3/2003 | Kasuga | | |
| 2008/0174213 | A1 | * | 7/2008 | Peterson et al. | ............ | 310/68 R |
| 2011/0018374 | A1 |   | 1/2011 | Yamasaki et al. | | |
| 2011/0031851 | A1 | * | 2/2011 | Uryu et al. | .................. | 310/68 B |
| 2011/0254393 | A1 | * | 10/2011 | Yamasaki et al. | .............. | 310/64 |
| 2011/0285223 | A1 | * | 11/2011 | Miyachi et al. | ................. | 310/64 |
| 2012/0073784 | A1 | * | 3/2012 | Chen | ........................... | 165/80.3 |
| 2012/0161590 | A1 | * | 6/2012 | Yamasaki | .............. | H02K 5/225 310/68 B |
| 2012/0267972 | A1 | * | 10/2012 | Leung et al. | ................... | 310/71 |

FOREIGN PATENT DOCUMENTS

| CN | 201860223 U | 6/2011 |
| JP | 08-289505   | 11/1996 |

OTHER PUBLICATIONS

Tomizawa, U.S. Appl. No. 13/834,234, filed Mar. 15, 2013.
Toda, U.S. Appl. No. 13/853,469, filed Mar. 29, 2013.
Abe et al., U.S. Appl. No. 13/853,432, filed Mar. 29, 2013.
Chinese Office Action issued in Patent Application No. 201310063869.6 dated Jan. 6, 2015 (w/ partial translation).
Office Action issued in CN App. No. 201310063869.6 dated Jun. 3, 2015 (with partial translation).
Office Action issued in corresponding Japanese Patent Application No. 2012-076248 dated Mar. 9, 2015 (with partial translation).

* cited by examiner

*Primary Examiner* — Jose Gonzalez Quinones
(74) *Attorney, Agent, or Firm* — Nixon & Vanderhye P.C.

(57) ABSTRACT

A motor drive apparatus includes a motor having a shaft, an end frame, and a control unit having a heat sink. The end fame and the heat sink are arranged to overlap at least partly when the end frame and the heat sink are projected on a plane, which is parallel with a rotation axis of the shaft. This arrangement improves heat radiation performance of the motor drive apparatus.

12 Claims, 6 Drawing Sheets

MOTOR DRIVE APPARATUS HAVING A MOTOR, ROTOR, STATOR AND HEAT SINK

CROSS REFERENCE TO RELATED APPLICATION

The present application is based on and incorporates herein by reference Japanese patent application No. 2012-76248 filed on Mar. 29, 2012.

TECHNICAL FIELD

The present disclosure relates to a motor drive apparatus, in which a motor and an electronic control unit for controlling the motor are integrated.

BACKGROUND

In some motor drive apparatuses for a conventional electric power steering system (EPS), which assists a steering operation of a driver by driving force of a motor, a motor and an electronic control unit for controlling the motor are integrated. For example, in a motor drive apparatus according to JP 2011-177001A (US 2011/0018374 A1), a semi-conductor module is provided on a heat sink to promote heat radiation.

In this motor drive apparatus, however, the heat sink is encapsulated within a cover and hence the heat radiation performance of the heat sink is not sufficient.

SUMMARY

It is therefore an object to provide a motor drive apparatus, which is capable of improving heat radiation performance.

According to one aspect, a motor drive apparatus includes a motor having a shaft, an end frame and an electronic control unit having a heat sink. The heat sink and the end frame are arranged to overlap at least partly when the heat sink and the end frame are projected onto a plane, which is parallel to a rotation axis of the shaft. Thus a contact area between the heat sink and the end frame is increased to promote more heat conduction from the heat sink to the end frame and improve the heat radiation performance. Since the heat sink and the end frame overlap in a radial direction, a size of the motor drive apparatus in an axial direction is reduced.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

A motor drive apparatus will be described below with reference to plural embodiments. Substantially the same configuration parts among plural embodiments are designated by the same reference numerals thereby to simplify the description.

(First Embodiment)

Referring to FIG. 1 to FIG. 5 showing a first embodiment, a motor drive apparatus 1 is used in an electric power steering system (EPS). The motor drive apparatus 1 is used in the EPS of a vehicle and includes a motor 20, an end frame 31 and an electronic control unit 40. The motor drive apparatus 1 is attached relative to a rack 10, which connects left and right wheels 9 of the vehicle, by arranging a shaft 24 in parallel with an axis of the rack 10. When a steering wheel 5 is operated by a driver, a torque generated in a steering shaft 6 by the steering operation is detected by a torque sensor 7. The motor drive apparatus 1 generates a torque, which assists a steering operation, based on a signal outputted from the torque sensor 7, a vehicle speed signal transferred from a CAN (controller area network) and the like. This torque is transferred to the rack 10 from an output end 242 of the shaft 24 of the motor 20 to the rack 10 through a gear 8.

Figure 1:
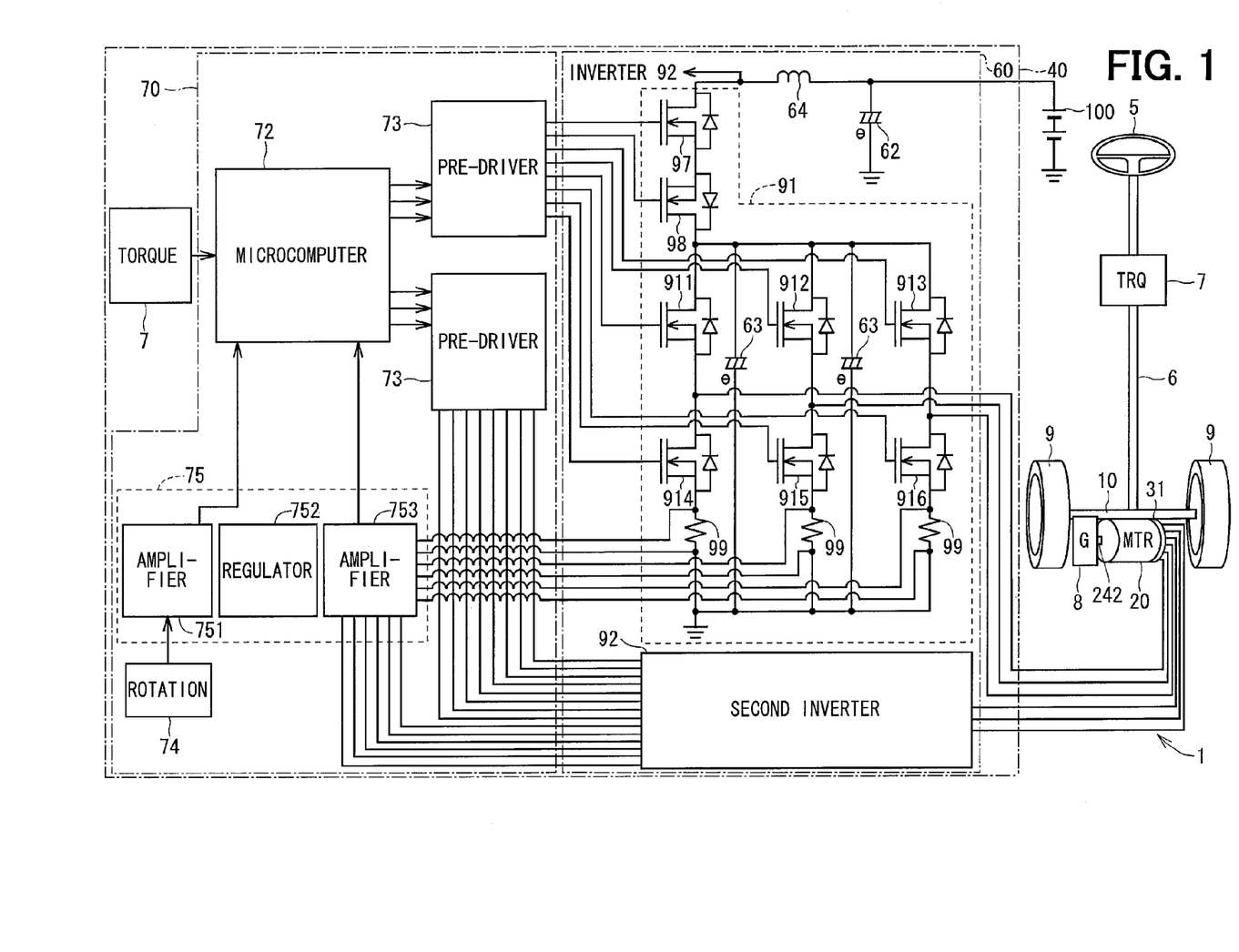
FIG. 1 is a schematic circuit diagram showing an electric configuration of a motor drive apparatus according to a first embodiment.

The electronic control unit 40 is configured as shown in FIG. 1. The electronic control unit 40 includes a driver circuit (power circuit) 60 for supplying large currents to the motor 20, and a control circuit 70 for controlling the driver circuit 60. The driver circuit 60 includes a first smoothing capacitor 62, a choke coil 64, and two (first and second) inverters 91, 92.

The first smoothing capacitor 62 and the choke coil 64 form a filter circuit to absorb noises developed and sent from other devices, which are connected to a power source 100 in common. The choke coil 64 is connected in series between the power source 100 and power relays 97, 98 to attenuate variation of a power source voltage.

The first inverter 91 includes MOSFETS (metal-oxide-semiconductor field-effect transistors, hereinafter referred to as FETS) 911 to 916. A source-drain path of each FETS 911 to 916 is controlled to turn on and off by a gate potential.

The three FETS 911, 912, 913 on a higher arm side (high potential side) have drains, which are connected to the power source 100 side, and sources, which are connected to drains of the FETS 914, 915, 916 on the lower arm side (low potential side), which correspond to the switching elements 911, 912, 913, respectively. The FETS 914, 915, 916 on the lower arm side have sources, which are grounded through shunt resistors 99. Junctions between the FETS 911, 912, 913 on the higher arm side and the FETS 914, 915, 916 on the lower arm side, which correspond to the FETS 911, 912, 913, respectively, are connected electrically to the motor 20. The second inverter 92 has the same configuration as the first inverter 91 and hence the description of the inverter 92 is omitted.

The driver circuit 60 includes power relays 97 and 98 for the inverters 91 and 92. The power relays 97 and 98 are formed of MOSFETS, which are similar to the FETS 911 to 916. The power relays 97 and 98 are connected between the FETS 911 to 913 and the choke coil 64 to interrupt the currents from flowing to the motor 20 side through the FETS 911 to 916 upon occurrence of abnormality.

The shunt resistors 99 are connected electrically between the FETS 914 to 916 and the ground. The currents supplied to the motor 20 are detected as voltages or currents applied to the shunt resistors 99.

Second capacitors 63 are connected between a power source side conductor of the FETS 911 to 913 of the higher arm side and a ground side conductor of the FETS 914 to 916 of the lower arm side. The second capacitors 63 are connected in parallel to the FETS 911 to 916. The second capacitors 63 supplement power supply to the FETS 911 to 916 by storing charges and absorb ripple currents generated by switching of the currents supplied to the motor 20.

The control circuit 70 includes a microcomputer 72, first and second pre-drivers 73, a rotation angle sensor 74 and a customized IC 75. The customized IC 75 includes, as functional blocks circuits, a rotation angle sensor signal amplifier 751, a regulator 752 and a detection voltage amplifier 753.

The regulator 752 is a stabilizer circuit for stabilizing electric power supplied from the power source 100. The regulator 752 stabilizes a voltage supplied to various circuit parts. For example, the microcomputer 72 operates with a predetermined voltage (for example, 5V) stabilized by the regulator 752.

The signal outputted from the rotation angle sensor 74 is inputted to the rotation angle sensor signal amplifier 751. The rotation angle sensor 74 detects the rotation position signal of the motor 20 and outputs the detected rotation position signal to the rotation angle sensor signal amplifier part 751. The rotation angle sensor signal amplifier 751 amplifies the rotation position signal and outputs an amplified signal to the microcomputer 72. The detection voltage amplifier 753 detects terminal voltages of the shunt resistors 99, amplifies detected voltages and outputs the amplified voltage values to the microcomputer 72.

The microcomputer 72 receives the signals of the rotation position signal of the motor 20, the voltages of the shunt resistors 99, the steering torque signal and the vehicle speed information. The microcomputer 72, receiving these signals, controls the inverter 91 by the pre-drivers 73 in correspondence to the rotation position signal. The microcomputer 72 specifically controls the first inverter 91 by controlling the on/off switching operations of the FETS 911 to 916 by varying the gate voltages of the six FETS 911 to 916 by the pre-drivers 73. The microcomputer 72 controls the first inverter 91 based on the voltages of the shunt resistors 99 inputted from the detection voltage amplifier 753 to approximate the currents supplied to the motor 20 in a sine wave form. The microcomputer 72 also controls the second inverter 92 in the similar manner as controlling the first inverter 91.

The motor drive apparatus 1 is configured mechanically as shown in FIG. 2 to FIG. 5.

Figure 2:
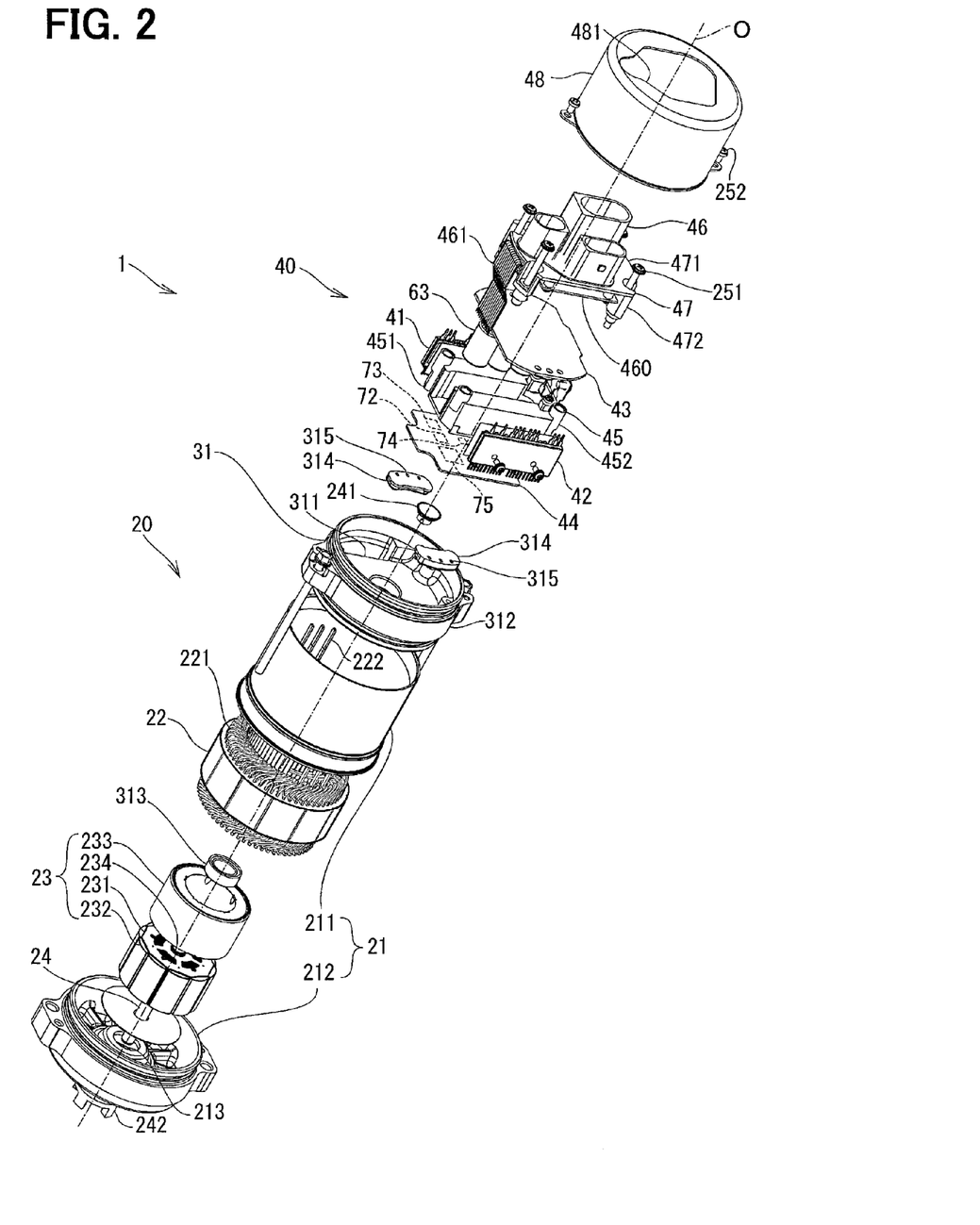
FIG. 2 is an exploded perspective view showing a mechanical configuration of the motor drive apparatus according to the first embodiment.
Figure 3:
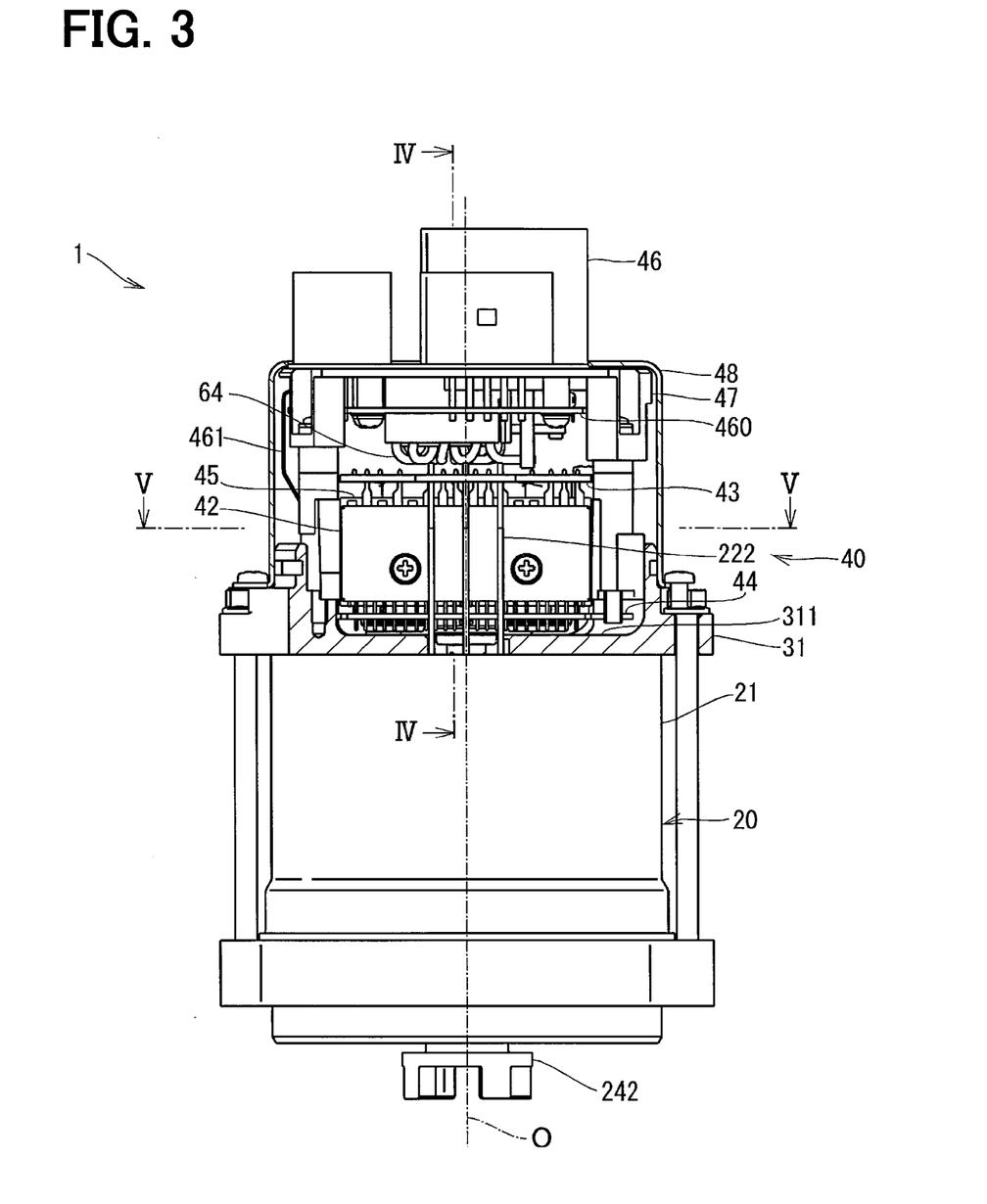
FIG. 3 is a side view of an electronic control unit of the motor drive apparatus according to the first embodiment.

As shown in FIG. 2 and FIG. 3, the motor 20, the end frame 31 and the electronic control unit 40 are arranged in an axial direction, that is, a direction of a central axis O, of the shaft 24. The central axis of the shaft 24 is a rotation axis O of the shaft 24. The end frame 31 is located between the motor 20 and the electronic control unit 40. The direction, which is perpendicular to the rotation axis O, is a radial direction. In the direction of the rotation axis O, the electronic control unit 40 side is referred to as one end side and the motor 20 side is referred to as the other end side.

The motor 20 includes a motor case 21, a stator 22, a rotor 23 and the shaft 24. The motor case 21 is formed in a bottomed cylinder shape by, for example, pressing an iron plate. The motor case 21 forms an outer shape of the motor 20. The motor case 21 includes a cylindrical peripheral wall 211 and a bottom wall 212, which is provided at the other end side of the peripheral wall 211 in the direction of the rotation axis O. The peripheral wall 211 of the motor case 21 has an opening at one end side, at which the end frame 31 is provided. The bottom wall 212 functions as another end frame, which closes the cylindrical wall 211 as the end frame 31 does.

The stator 22 is provided on the inside wall of the peripheral wall 211 of the motor case 21. The stator 22 is formed of a stacked iron core, which is a stack of thin magnetic plates, and coils 221 wound about the stacked iron core. Motor wires 222 extending from the coils 221 are led out toward the electronic control unit 40 side. The motor wires 222 are electrically connected to a driver circuit substrate 43 through a control circuit substrate 44 and a radially outside space of power modules 41 and 42.

The rotor 23 is located radially inside the stator 22 to be rotatable relative to the stator 22. The rotor 23 is formed of, for example, a magnetic material such as iron, in a cylindrical shape. The rotor 23 includes a rotor core 231, permanent magnets 232 provided on a radially outside surface of the rotor core 231 and a cylindrical rotor cover 233, which covers the rotor core 231. The permanent magnets 232 are arranged such that a N-pole and a S-pole are provided alternately in the peripheral direction (circumferential direction).

The shaft 24 is firmly fixed to a shaft hole 234 formed in the radial center of the rotor core 231. The shaft 24 is supported rotatably by bearings 213 and 313, which are provided in the bottom wall 212 of the motor case 21 and the end frame 31, respectively. Thus, the shaft 24 is rotatable with the rotor 23 relative to the stator 22.

The shaft 24 has a magnet 241 at an axial end, which is on the electronic control unit 40 side. This magnet 241 is exposed to the electronic control unit 40 side and faces an end surface of the control circuit substrate 44 at the motor 20 side. On the other hand, the shaft 24 has the output end 242 at an axial end part, which is axially opposite to the electronic control unit 40. The output end 242 is engaged with the gear 8 and drives the gear 8 to rotate for driving the rack 10 (FIG. 1), when the shaft 24 is rotated.

The end frame 31 is formed of, for example, a good heat conductive metal such as aluminum, and provided at one axial end side of the motor case 21. The end frame 31 is formed in a bottomed cylindrical shape to have a flat bottom wall 311 as a holder plate and a side wall 312, which is a cylindrical peripheral wall extending from the bottom wall 311 in the axial direction toward the electronic control unit 40 side.

The bearing 313 is firmly fitted in the center of the bottom wall 311 to rotatably support the shaft 24. Holding members 314 are provided on the bottom wall 311 at positions opposing each other in the radial direction. Each holding member 314 has plural through holes 315. The holding members 314 hold the motor wires 222, which pass the through holes 315.

The side wall 312 is raised from the radially outer peripheral part of the bottom wall 311 in the one end side in the direction of the rotation axis O. The bottom wall 311 and the side wall 312 forms an accommodation space 310, which is open to the one end side, that is, open toward the electronic control unit 40 side.

The electronic control unit 40 includes, in addition to the driver circuit substrate 43 and the control circuit substrate 44, a heat sink 45, two (first and second) power modules 41, 42 as a power unit, a connector 46, a component carrier 47 and a cover 48.

Figure 5:
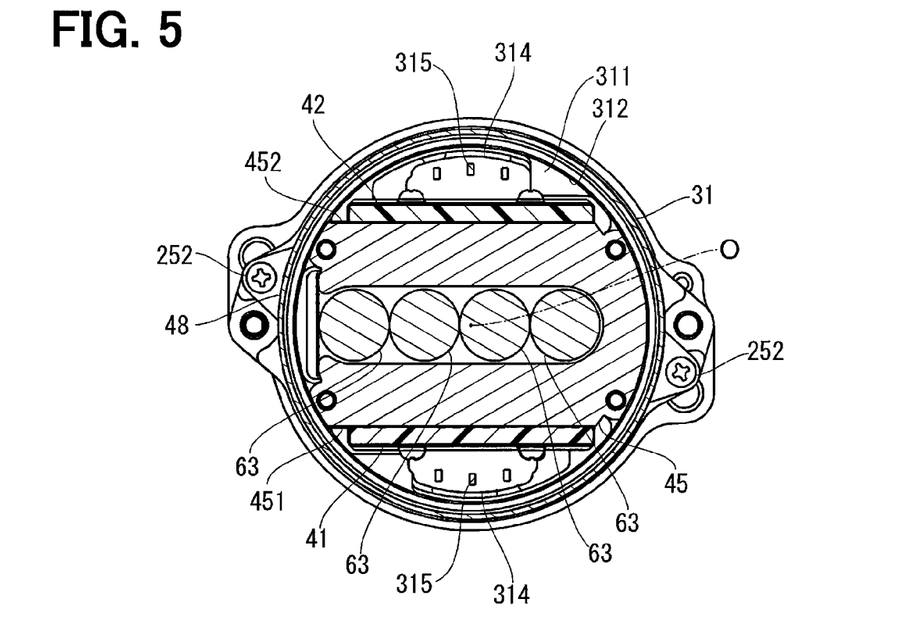
FIG. 5 is a plan view showing the electronic control unit in section taken along a line V-V in FIG. 3.

The heat sink 45 is formed of, for example, a good heat conductive metal such as aluminum, separately from the end frame 31. The heat sink 45 is located on a surface of one axial end side of the bottom wall 311 of the end frame 31 in the direction of the rotation axis O. The heat sink 45 is provided such that a part of the heat sink 45 in the direction of the rotation axis O is accommodated within the accommodation space 310 of the end frame 31. That is, when the heat sink 45 and the end frame 31 are projected on a plane parallel to the direction of the rotation axis O, the heat sink 45 and the end frame 31 overlap partly. That is, the heat sink 45 has a height greater than that of the side wall 312 of the end frame 31 in the axial direction of the motor 20. Hence the lower part of the heat sink 45 is hidden by the side wall 312 when viewed in the radial direction from the outside of the side wall 312. The heat sink 45 is provided to contact the inner wall surface of the side wall 312 of the end frame 31 in the radial direction as shown in FIG. 5. The heat sink 45 includes two (first and second) blocks 451 and 452 arranged in parallel to face each other in the radial direction sandwiching the rotation axis O.

The first power module 41 is formed by molding the power relays 97, 98, the FETS 911 to 916, the resistors 99 and electric conductors connecting those components, all of which form the first inverter 91, by resin.

The second power module 42 is formed by molding the FETS and the like, which form the second inverter 92, by resin. The first power module 41 and the second power module 42 thus have substantially the same configuration.

The power modules 41 and 42 are located between the heat sink 45 and the side wall 311 of the end frame 31 in the radial direction. The power module 41 is attached to the outer wall of the block 451 and the power module 42 is attached to the outer wall of the block 452. Thus, the power modules 41 and 42 are arranged symmetrically relative to the rotation axis O. The power modules 41 and 42 are provided on the heat sink 45 to be parallel to the direction of the rotation axis O. The power modules 41 and 42 need not necessarily be arranged symmetrically and in parallel but may be arranged to face each other with some inclination to each other.

The second smoothing capacitors 63 and the like, which form the driver circuit 60 but are generally large in size and not integrated into a semiconductor chip, are mounted on the driver circuit substrate 43. On the driver circuit substrate 43, electric conductors are formed to allow currents to flow from the power source 100 to the coils of the motor 20 through two power modules 41 and 42. Thus the FETS 911 to 916 are connected electrically on the driver circuit substrate 43 to allow the drive currents to flow to drive the motor 20. The driver circuit substrate 43 is attached to one axial end side of the heat sink 45 to be in contact with the heat sink 45 in the axial direction.

On the control circuit substrate 44, the microcomputer 72, the pre-drivers 73, the rotation angle sensor 74 and the customized IC 75, all of which form the electronic control unit 40, are mounted. On the control circuit substrate 44, electric conductors are formed to allow control currents to flow to control on/off switching operations of the FETS 911 to 916 of the power modules 41 and 42. Thus, the FETS 911 to 916 are connected electrically on the control circuit substrate 44 to allow the control currents to flow for controlling the motor 20. The control circuit substrate 44 is attached to the other end side of the heat sink 45 to be in contact with the heat sink 45.

Figure 4:
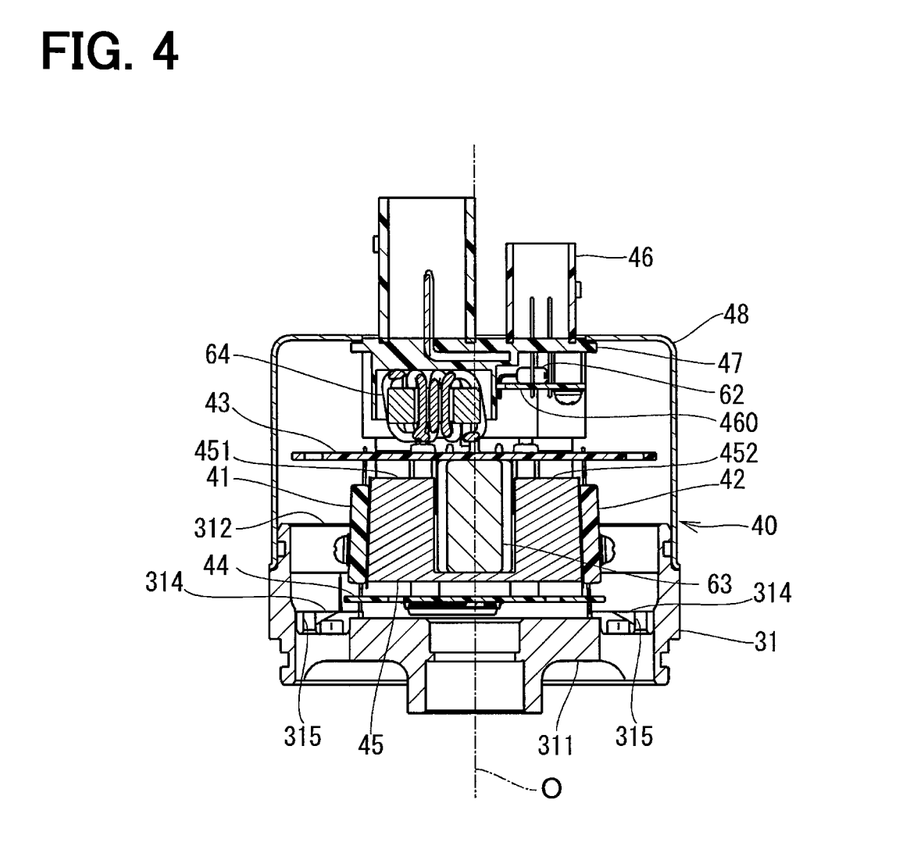
FIG. 4 is a sectional view of the electronic control unit taken along a line IV-IV in FIG. 3.

As shown in FIG. 4 and FIG. 5, when the power modules 41, 42, the driver circuit substrate 43, the control circuit substrate 44, the heat sink 45 and the end frame 31 are projected in a direction of the rotation axis O, the power modules 41, 42, the driver circuit substrate 43, the control circuit substrate 44 and the heat sink 45 are provided within the inside of the end frame 31.

The connector 46 and the component carrier 47 are integrally formed of, for example, resin, and provided oppositely to the output end 242 in the axial direction.

The component carrier 47 includes a plate 471, which is formed in a rectangular shape to extend substantially perpendicularly to the rotation axis O of the motor 20. Bolts 251 are inserted into legs 472 so that the component carrier 47, the heat sink 45 and the end frame 31 are fixed. On the component carrier 47, a connector substrate 460, on which the connector 46, the choke coil 64 and the first smoothing capacitor 62 are electrically connected, is provided. The connector substrate 460 is electrically connected to signal wires 461. The signal wires 461 are electrically connected to electronic circuits of the control circuit substrate 44.

A cover 48 is formed in a bottomed cylindrical shape to house therein the driver circuit substrate 43, the control circuit substrate 44, the heat sink 45 and the component carrier 47. The cover 48 is fixed to the end frame 31 by the bolts 252. The cover 48 has a hole 481 at the opposite side to the output end 242 to pass the connector 46 therethrough. The connector 46 passes the hole 481 from the inside of the cover 48 and extends axially in a direction opposite to the output end 242.

The motor drive apparatus 1 according to the present embodiment provides the following advantages.

The end frame 31 and the heat sink 45 are located to overlap partly when the end frame 31 and the heat sink 45 are projected on a plane, which is parallel with the rotation axis O. The heat sink 45 contacts both of the bottom wall 311 and the side wall 312. Thus, the contact areas between the end frame 31 and the heat sink 45 can be increased and heat conduction from the heat sink 45 to the end frame 31 can be promoted. The heat radiation performance of the motor drive apparatus 1 can be improved. Since the end frame 31 and the heat sink 45 partly overlap when the end frame 31 and the heat sink 45 are projected on the plane, which is parallel with the rotation axis O, the motor drive apparatus 1 can be reduced in size in the direction of the rotation axis O.

The power modules 41 and 42 are mounted on the heat sink 45 in parallel to the rotation axis O. The motor drive apparatus 1 can be reduced in size in a radial direction.

The power modules 41 and 42 are located between the end frame 31 and the heat sink 45 in the radial direction. Thus, the motor drive apparatus 1 can be reduced in size in the direction of the rotation axis O.

The power modules 41 and 42 are located symmetrically relative to the rotation axis O. Thus designing the location of the power modules 41 and 42 and assembling of the same can be finished in a short time.

The driver circuit substrate 43 contacts the end surface of one axial side of the blocks 451 and 452 of the heat sink 45 in the axial direction and the control circuit substrate 44 contacts the other end surface of the blocks 451 and 452 of the heat sink 45. Thus, heat transfer from the driver circuit substrate 43 and the control circuit substrate 44 to the heat sink 45 can be promoted.

The power modules 41, 42, the driver circuit substrate 43, the control circuit substrate 44, the heat sink 45, the first smoothing capacitor 62, the choke coil 64, the second smoothing capacitors 63, the microcomputer 72, the pre-drivers 73, the rotation angle sensor 74, the customized IC 75 and the like are all located within the end frame 31, when these parts are viewed or projected in the direction of the rotation axis O. Thus, the motor drive apparatus 1 can be reduced in size in the radial direction.

(Second Embodiment)

Figure 6:
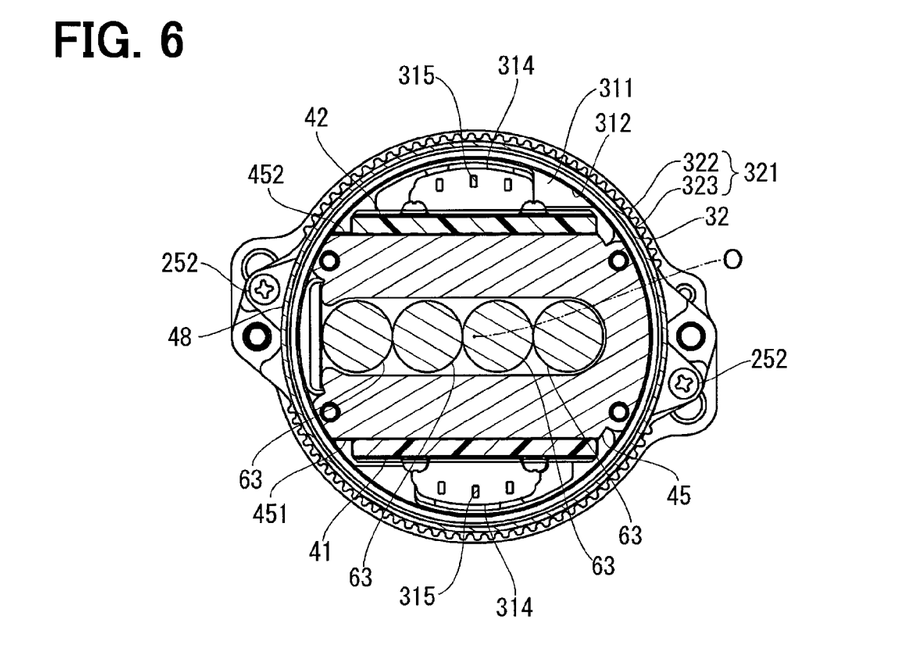
FIG. 6 is a plan view showing a motor drive apparatus in section according to a second embodiment.

According to a second embodiment, a motor drive apparatus is configured as shown in FIG. 6.

Specifically, an end frame 32 is formed with a concave-convex part 321 on a radially outside wall surface (outside wall surface) of a side wall of the end frame 32. The concave-convex part 321 includes convex parts 322 and concave parts 323. The convex parts 322 are projected on the side wall in a radially outward direction and extend longitudinally, that is, in the direction of the rotation axis O. The concave parts 323 are dented on the convex parts 322 in the radially inward direction and extend in the direction of the rotation axis O. The convex part 322 and the concave part 323 are arranged alternately in the circumferential direction.

Since the concave-convex part 321 is formed on the radially outer wall surface of the side wall of the end frame 32, the surface area of the outer wall surface of the side wall of the end frame 32 is increased. Thus the heat radiation performance of the end frame 32 can be improved.

(Third Embodiment)

Figure 7:
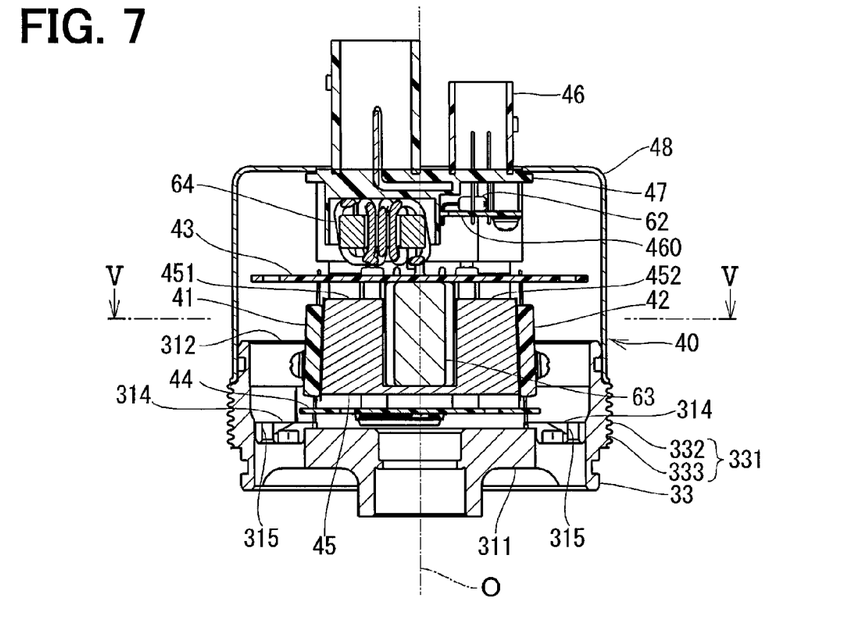
FIG. 7 is a side view showing in section a motor drive apparatus according to a third embodiment.

According to a third embodiment, a motor drive apparatus is configured as shown in FIG. 7.

Specifically, an end frame 33 is formed with a concave-convex part 331 on a radially outer wall surface of a side wall of the end frame 33. The concave-convex part 331 includes convex parts 332 and concave parts 333. The convex parts 332 are projected on the side wall in a radially outward direction and extend in the circumferential direction. The concave parts 333 are dented on the side wall in the radially inward direction and extend in the circumferential direction. The convex part 332 and the concave part 333 are arranged alternately in the direction of the rotation axis O.

Since the concave-convex part 331 is formed on the radially outer wall surface of the side wall of the end frame 33, the surface area of the outer wall surface of the side wall of the end frame 33 is increased. Thus the heat radiation performance of the end frame 33 can be improved.

(Fourth Embodiment)

Figure 8:
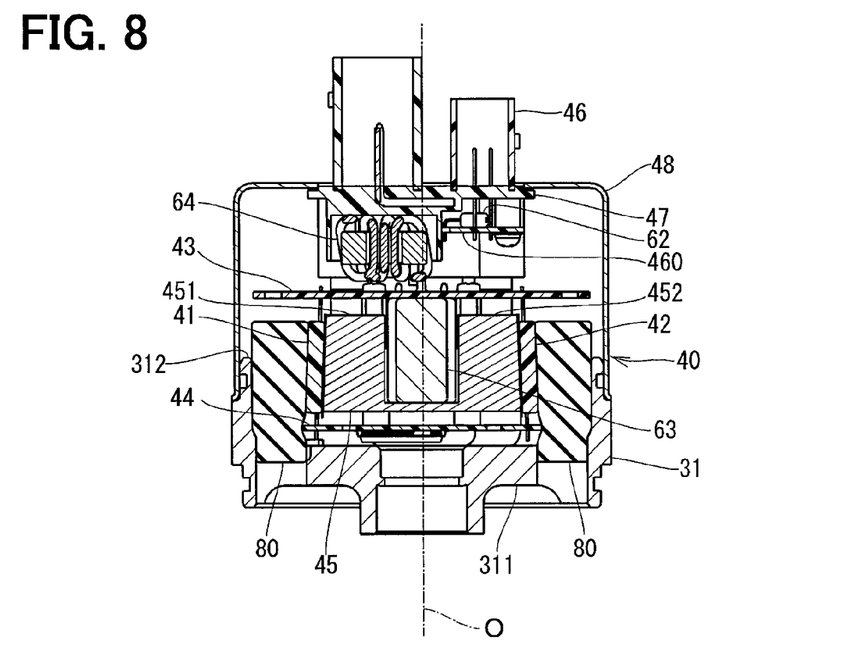
FIG. 8 is a side view showing in section a motor drive apparatus according to a fourth embodiment.

According to a fourth embodiment, a motor drive apparatus is configured as shown in FIG. 8.

Specifically, a heat radiating member 80 is further provided. The heat radiating member 80 are located between the side wall of the end frame 31 and the power modules 41, 42.

The heat radiating member 80 is formed of a good heat conductive material such as silicone and provided to contact the inner wall surface of the side wall of the end frame 31 and contact the power modules 41 and 42. Thus, heat transfer from the power modules 41, 42 and the heat sink 45 to the end frame 31 can be further promoted.

(Other Embodiment)

In the above-described embodiments, the motor drive apparatus 1 is used exemplarily in the EPS of the vehicle. As the other embodiment, the motor drive apparatus may be used in other fields.

In the above-described embodiments, the electronic control unit 40 is located exemplarily at an axial side opposite to a gear box of the motor 20. However, as the other embodiment, the electronic control unit 40 may be located between the motor 20 and the gear box. In this embodiment, the shaft 24 of the motor 20 is extended toward the gear box side while passing a space between the heat sink blocks facing each other and passing through the control circuit substrate 43 and the driver circuit substrate 44.

In the above-described embodiments, two inverters 91 and 92 are used exemplarily to drive the motor 20. As the other embodiment, only one or three or more inverter circuits may be used to drive the motor 20.

In the above-described embodiments, the heat sink 45 and the end frame 31, 32, 33 are arranged to overlap partly when the heat sink 45 and the end frame 31, 32, 33 are projected on the plane parallel to the rotation axis O. However, as the other embodiment, the heat sink 45 and the end frame 31, 32, 33 may be arranged to overlap fully when the both are projected on the plane parallel to the rotation axis O.

The motor drive apparatus is not limited to the above-described embodiments, but may be implemented in other different embodiments.

What is claimed is:

1. A motor drive apparatus comprising:
   a motor including a motor case of a cylindrical shape, a stator fixed to the motor case, a rotor housed radially inside the stator, and a shaft rotatable with the rotor;
   an end frame being made of metal and including a bottom wall, which is provided at one axial end of the motor case in a direction of a rotation axis of the shaft to close one open end of the cylindrical shape and to support the shaft rotatably, and a side wall, which extends from the bottom wall in the direction of the rotation axis at a side opposite to the motor case;
   a heat sink located on the bottom wall at the side opposite to the motor case and contacting the end frame; and
   a control unit contacting the heat sink and including a power unit for driving the motor,
   wherein all of the side wall of the end frame, the power unit, and the heat sink are arranged to overlap one another at least partly in the direction of the rotation axis of the shaft when the heat sink, the power unit, and the end frame are projected on a plane, which is parallel to the direction of the rotation axis of the shaft, so that heat of the control unit is transferred from the heat sink to both of the bottom wall and the side wall of the end frame, and
   wherein the heat sink includes two blocks, which are formed integrally and arranged in parallel to face each other sandwiching the rotation axis of the shaft and contacting the end frame, and
   wherein the power unit is located between the heat sink and the side wall of the end frame in a direction perpendicular to the rotation axis of the shaft.

2. The motor drive apparatus according to claim 1, wherein:
   the end frame has a concave-convex part on a radially outside surface of the side wall of the end frame.

3. The motor drive apparatus according to claim 1, further comprising:
   a heat radiating member located between the side wall of the end frame and the power unit in a direction perpendicular to the shaft and contacting both of the side wall of the end frame and the power unit.

4. The motor drive apparatus according to claim 1, wherein:
   the power unit is provided in parallel with the rotation axis of the shaft.

5. The motor drive apparatus according to claim 1, wherein:
the power unit includes plural power modules; and
the plural power modules are located symmetrically relative to the rotation axis of the shaft.

6. The motor drive apparatus according to claim 1, further comprising:
a control circuit substrate located at an end frame side of the heat sink and in contact with the heat sink, the control circuit substrate connected electrically to the power unit to supply control currents for controlling the motor;
a magnet provided at an axial end of the shaft near the end frame and exposed to face an end surface of the control circuit substrate; and
a rotation angle sensor angle sensor provided on the control circuit substrate to detect rotation of the magnet.

7. The motor drive apparatus according to claim 6, further comprising:
a driver circuit substrate located at an axial side opposite to the end frame of the heat sink and in contact with the heat sink, the driver circuit substrate connected electrically to the power unit to supply drive currents to the motor.

8. The motor drive apparatus according to claim 7, wherein:
the power unit, the driver circuit substrate, the control circuit substrate and the heat sink are positioned radially inside the end frame when the power unit, the driver circuit substrate, the control circuit substrate and the heat sink are projected on a plane perpendicular to the rotation axis of the shaft.

9. The motor drive apparatus according to claim 1, wherein:
the end frame and the heat sink are made of aluminum separately; and
the heat sink contacts both of the bottom wall and the side wall of the end frame.

10. The motor drive apparatus according to claim 9, wherein the two blocks of the heat sink are connected integrally into a U-shape and a bottom part of the U-shape is in contact with an inner wall surface of the side wall of the end frame.

11. The motor drive apparatus according to claim 10, wherein the control unit includes capacitor, which are located radially inside the U-shape of the heat sink.

12. The motor drive apparatus according to claim 1, wherein:
the heat sink has a first side wall, which is in contact with the side wall of the end frame in the direction perpendicular to the rotation axis of the shaft, and
the heat sink has a second side wall, which is separated from the side wall of the end frame in the direction perpendicular to the rotation axis of the shaft; and
the power unit is fixed to the second side wall of the heat sink.

* * * * *